United States Patent
Coca et al.

(10) Patent No.: US 7,890,622 B2
(45) Date of Patent: Feb. 15, 2011

(54) REAL-TIME NOTIFICATION OF DEVICE EVENTS

(75) Inventors: Dinesh C. Coca, Tucson, AZ (US);
James B. Engle, Green Valley, AZ (US);
Melissa J. Garcia, Tucson, AZ (US);
Kevan D. Holdaway, Tucson, AZ (US);
Andrew G. Hourselt, Tucson, AZ (US);
Ashaki A. Ricketts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 11/696,041

(22) Filed: Apr. 3, 2007

(65) Prior Publication Data

US 2008/0250169 A1    Oct. 9, 2008

(51) Int. Cl.
*G06F 15/173* (2006.01)
(52) U.S. Cl. ..................................... 709/224
(58) Field of Classification Search .............. 709/224; 710/52, 54
See application file for complete search history.

(56) References Cited

U.S. PATENT DOCUMENTS

| | | | | |
|---|---|---|---|---|
| 6,321,289 | B1* | 11/2001 | Engfer et al. | 710/260 |
| 7,174,557 | B2* | 2/2007 | Sanghvi et al. | 719/318 |
| 7,237,016 | B1* | 6/2007 | Schober | 709/223 |
| 2005/0235002 | A1* | 10/2005 | Zarenin | 707/201 |
| 2005/0273503 | A1 | 12/2005 | Carr et al. | |
| 2006/0155698 | A1 | 7/2006 | Vayssiere | |
| 2006/0173985 | A1 | 8/2006 | Moore | |
| 2006/0218316 | A1* | 9/2006 | Biran et al. | 710/54 |
| 2006/0222153 | A1* | 10/2006 | Tarkoff et al. | 379/159 |
| 2006/0230071 | A1 | 10/2006 | Kass et al. | |
| 2007/0291958 | A1* | 12/2007 | Jehan | 381/103 |
| 2008/0141261 | A1* | 6/2008 | Machida | 718/104 |

OTHER PUBLICATIONS

Buehler et al., "Visualizing Live Text Streams Using Motion and Temporal Pooling", IEEE Computer Graphics, May/Jun. 2005.
Sandars et al., "There Has Never Been a Better Time to E-Communicate", BMJ Careers, Dec. 17, 2005.

* cited by examiner

*Primary Examiner*—Frantz B Jean
(74) *Attorney, Agent, or Firm*—Dan Shifrin

(57) ABSTRACT

Real-time notification is provided of an event which has occurred in a computer-related device. Upon the occurrence of an event, a record of the event is stored in a buffer, such as a Really Simple Syndication buffer, associated with the device. The buffer is updated based on indications and other events noted by a CIM agent in the device. One of a series of regular requests is received from an open browser window on a user computer, the request inquiring about any record of the event stored in the buffer. In response to the request, the record of the event is transmitted to an HTML event element in a page of the browser window whereby the record of the event is inserted into the HTML element and displayed in the browser window.

15 Claims, 3 Drawing Sheets

REAL-TIME NOTIFICATION OF DEVICE EVENTS

TECHNICAL FIELD

The present invention relates generally to computer systems and, in particular, to the transfer of information, such as event records, from a common information model (CIM) agent installed on a computer-related device to a configuration manager installed on a management station.

BACKGROUND ART

In data computing systems, events may occur in attached devices which are indicative of performance degradations, process or performance issues, outright device failures, out-of-range temperatures, maintenance intervals, changed device configurations, reboot or power-on events, failed logons, etc. Other events may occur which represent normal operations, such as user activity. It may be important for a system administrator or other user to be made aware of such events, particularly those having a negative impact on the system. Even when a log of events is kept by the device or by an intermediate system component, providing such information to the user on a timely basis may be difficult.

SUMMARY OF THE INVENTION

The present invention provides real-time notification of an event which has occurred in a computer-related device. In one embodiment, upon the occurrence of an event, a record of the event is stored in a buffer associated with the device. One of a series of regular requests is received from an open browser window on a user computer, the request inquiring about any record of the event stored in the buffer. In response to the request, the record of the event is transmitted to an HTML event element in a page of the browser window whereby the record of the event is inserted into the HTML element and displayed in the browser window.

In another embodiment, the present invention includes a system for providing real-time notification of events associated with a computer-related device. The system includes a buffer operable to store a record of a predetermined event occurring in a computer-related device and a common information model (CIM) agent associated with the device. The CIM is operable, upon the occurrence of the event, to receive a registration of an identity of a system management application SMA), transmit an event notification to the SMA, receive a command from the SMA requesting the record of the event, and direct that the buffer transmit the record of the event to the SMA for subsequent transmission to a user computer and insertion into a predetermined HTML element in a web browser window of the computer for display in the browser window.

DETAILED DESCRIPTION OF THE PREFERRED EMBODIMENT

Figure 1:
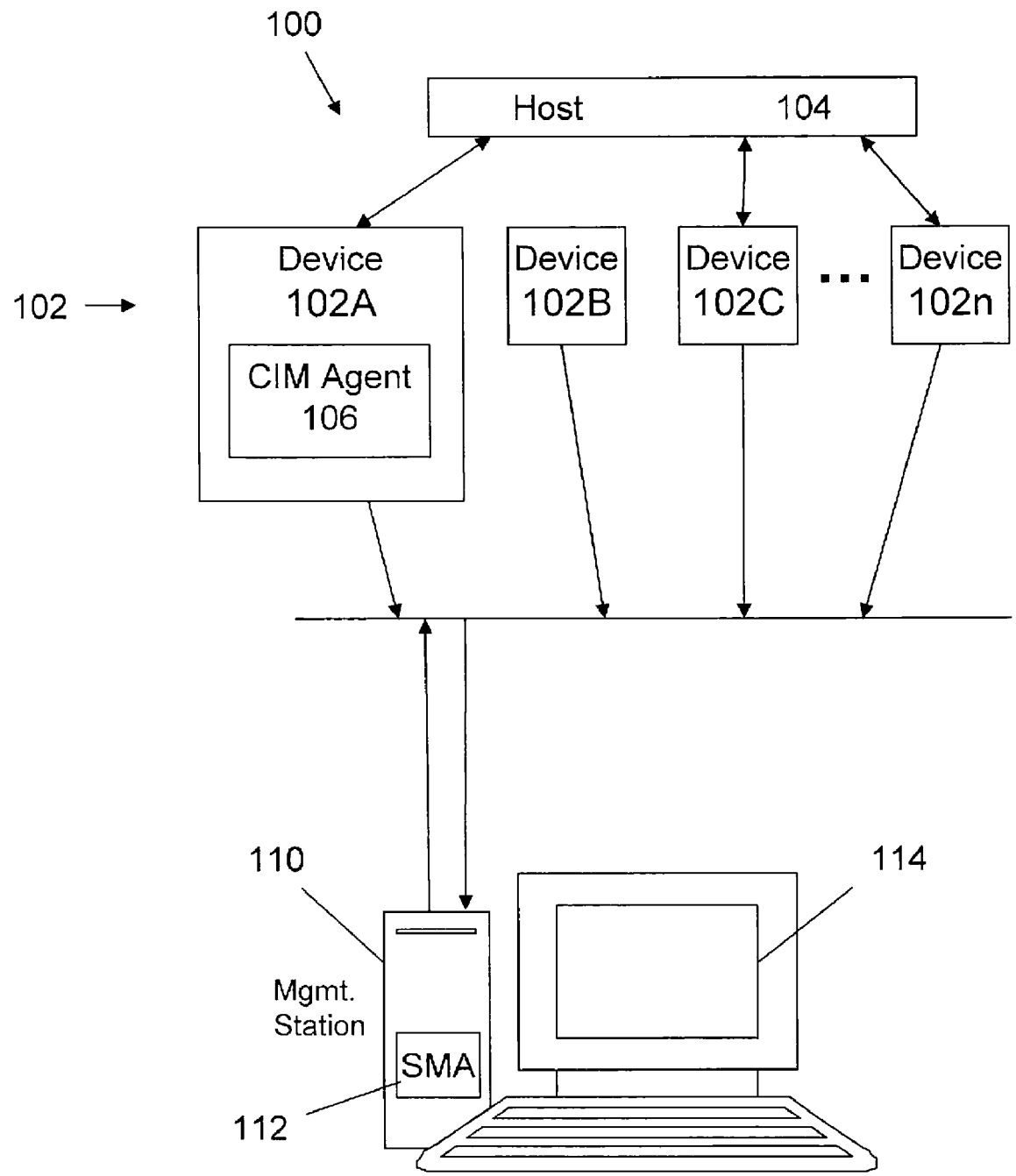
FIG. 1 is a block diagram of a data computing system in which the present invention may be implemented.

FIG. 1 is a block diagram of a data computing system 100 in accordance with the present invention. The system 100 includes one or more computer-related devices 102A, 102B, 102C . . . 102n (collectively referred to as 102) which may be independent, as is device 102B, or attached to one or more hosts 104, as are devices 102A and 102C-102n. A device 102 may be storage device, a server, printer, data storage library, workstation, advanced network device or any other device which supports the Common Information Model (CIM). The system 100 further includes a management station 110 on which resides a system management application (SMA) 112, such as a storage configuration manager (SCM) when a device 102 is a storage device. Other management applications may be employed for other, non-storage types of devices. The management station 110 may be any type of computer, such as a personal computer, a blade, a server, etc. The SMA manages or supervises the operation of a single machine, a class of devices or all of the devices in a system domain. For example, a storage configuration manager sets up and allocates storage space on a storage device in pools and/or volumes and may also map storage space to the host 104. An SCM may also manage disk sparing in a RAID system. The SMA 112 is accessed by a user of the management station 110 through a web browser.

The devices 102 use a CIM agent, such as CIM agent 106 deployed on the storage device 102A to communicate with the SMA 112. Information flow from the CIM agent 106 to the SMA 112 may be event-based, such as device errors or other irregular events, or be the result of a specific SMA request.

It is desirable for the SMA 112 to be "lightweight" with respect to resources required for its operation. It is also desirable for the SMA 112 to provide real-time status information related to the managed devices 102. However, for status or event information to be provided on a real-time basis, status data is typically acquired continuously or at regular but relatively short intervals. If request polling by the SMA 112 is employed, the resources required by the SMA 112 would increase, thereby reducing its lightweight nature. One possible alternative is for the CIM agent 106 to store event information indications in a log at regular intervals. A "subscription" by the SMA 112 would allow the indications to be received by the SMA 112. However, there is a risk that such a log will become filled quickly with old information being overwritten by new information or will be archived before being seen by the user.

The present invention instead provides for the SMA 112 to generate regular requests to the CIM agent 106 for updated event information and uses an XML-based or ASCII-based protocol, such as a Really Simple Syndication (RSS) feed, to insert the information into a web browser window 114 of the management station 110, thereby relieving the SMA 112 itself from resource-intensive polling.

Figure 2:
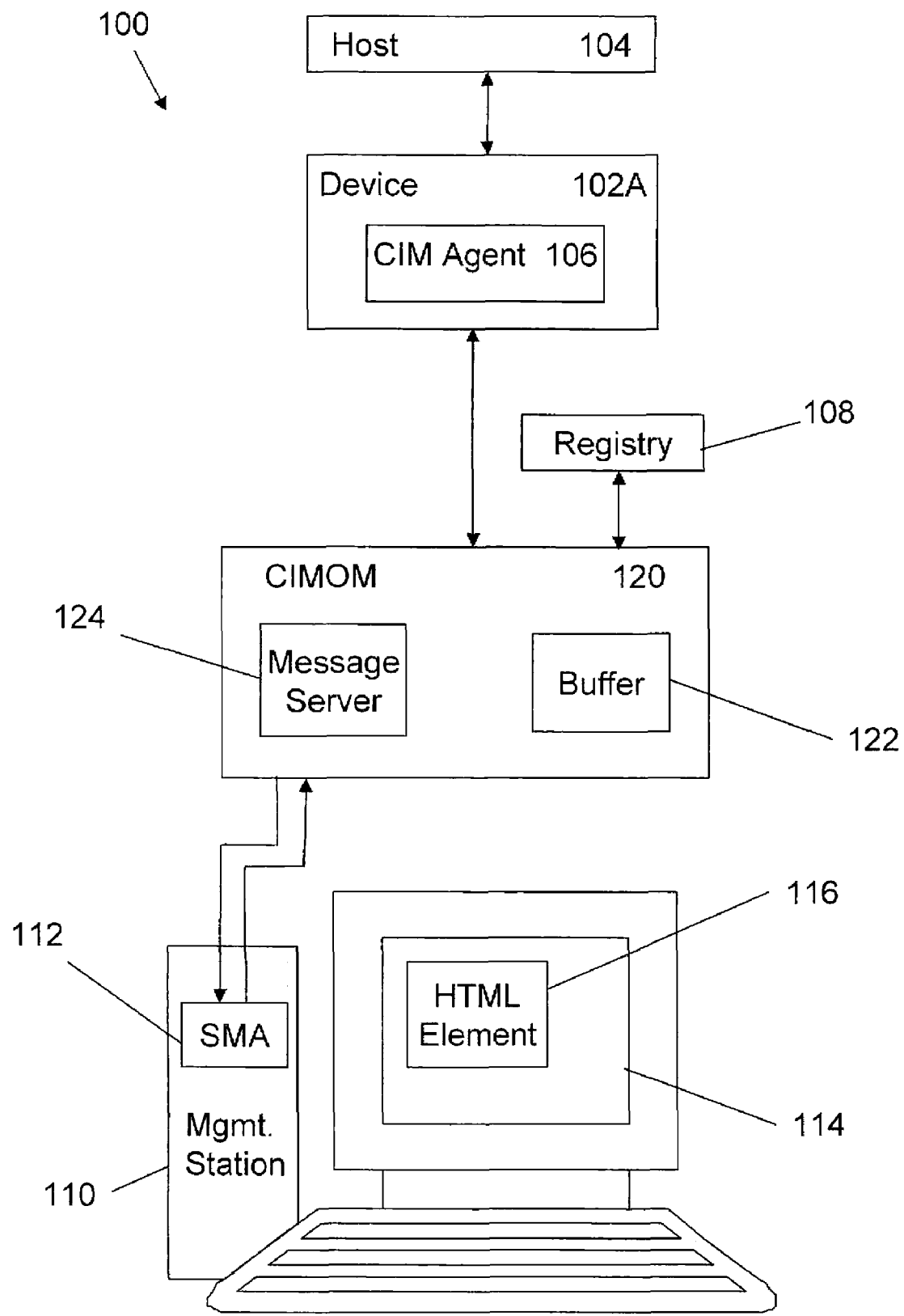
FIG. 2 is block diagram of the data computing system in accordance with the present invention.
Figure 3:
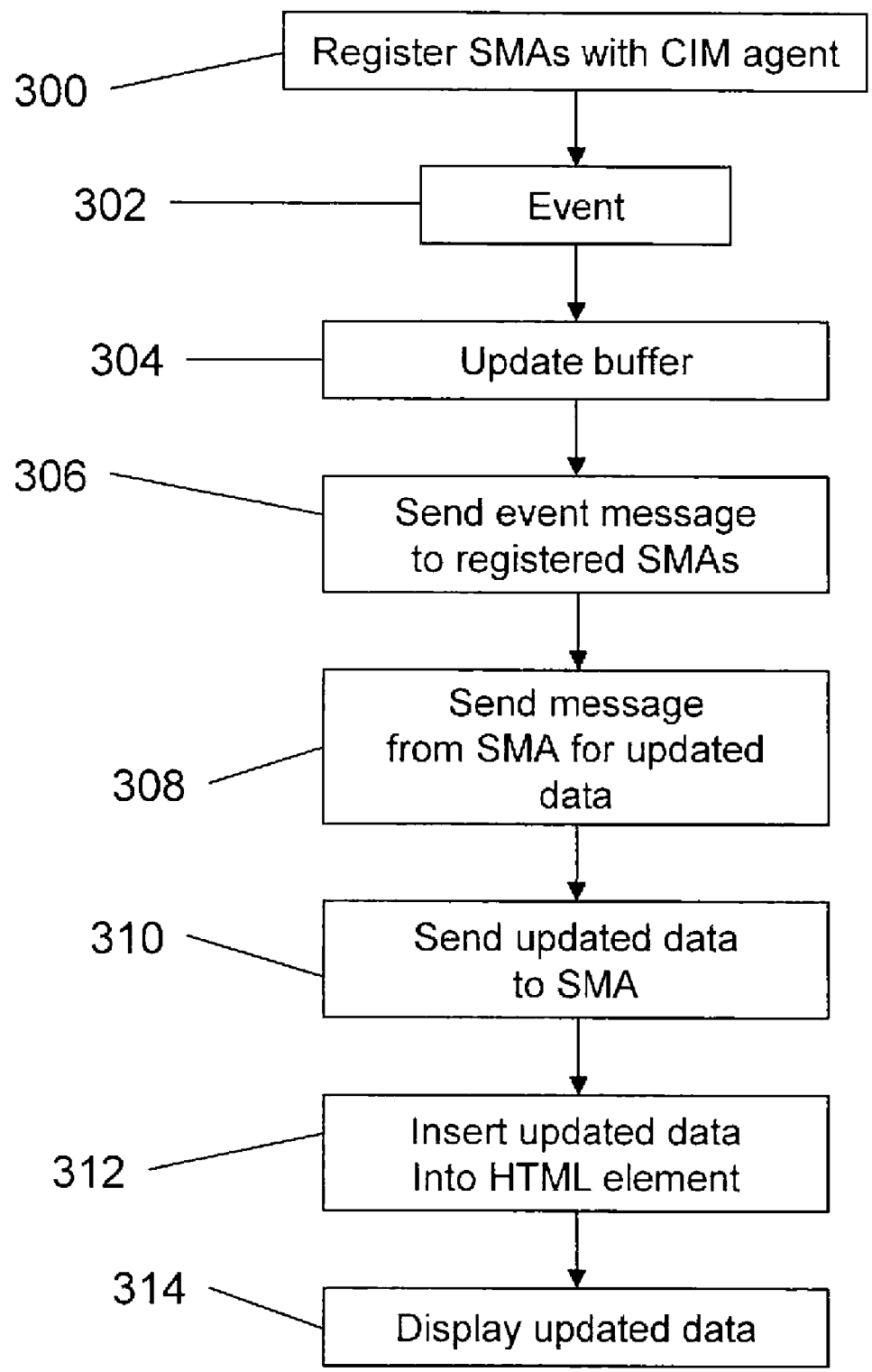
FIG. 3 is a flow chart of a method of the present invention.

Referring now to the block diagram of FIG. 2 and the flow chart of FIG. 3, the SMA 112 registers with the CIM agent 106 deployed on the device 102A (step 300) in order to let the CIM agent 106 know that the SMA 112 is to receive event information related to the device 102A. Other SMAs (not shown) may also register with the CIM agent 106 and any SMA may register with the CIM agent of more than one device 102. For purposes of clarity, however, only a one-to-one relationship will be described herein. To register, the SMA 112 sends a method call to "DiskDrive.eventNotify (IPAddress)" which includes parameters which tell the CIM agent 106 the location of the SMA 112. Such parameters may include the uniform resource identifier (UID) and the IP address of the SMA 112, among other identifying information. Upon receipt of the registration request, the CIM agent 106 stores the information in a registry table 108. The registration information for any other SMA is likewise stored in the registry table 108.

Upon the occurrence of an event (step 302), a record containing the event information is stored in a buffer 122 (step 304). The buffer 122 is associated with a CIM Object Manager (CIMOM) 120 which, although shown in FIG. 2 as an independent block, may be incorporated into the device 102A or into the management station 110. The CIMOM 120 manages CIM data structure to model the current state and configuration of supported devices and provides access to the devices for systems management applications. The registry table 108 is preferably co-located with the buffer 122. The events which event information to be stored are preferably predetermined and may include performance degradations, process or performance issues, outright device failures, out-of-range temperatures, maintenance intervals, changed device configurations, reboot or power-on events, failed logons, etc. The buffer 122 may be associated with a single CIM agent 106 or with several CIM agents. That is, a CIM agent may be associated with an buffer dedicated to that CIM agent, as illustrated in FIG. 2, or may share an buffer with other CIM agents. The CIM agent 106 next sends a message to a CIMOM message server 124 to the SMA 112, and to all other registered SMAs, notifying the SMA 112 that the buffer has been updated (step 306). More specifically, after the buffer 122 is updated, the CIM agent 106 sends a message, such as "newEventOccurred(eventNotify sourceObject, String bufferAffected)", to the eventNotifyRegistry 108. Commands are made to the registry 108 to look up the source object in the registry table to identify all SMAs that have registered to receive event notifications for the affected device 102A. Based on the table entries, the CIM agent 106 sends an event message in cimXML format using a transport protocol such as HTTP through the message server 124 to the IP address of the SMA 112 and of all other registered SMAs. After the SMA 112 receives the event notification message, the SMA responds with a message, such as "GET/disk-errors.event", back to the CIM agent 106 (step 308) and the updated data is sent from the buffer 122 to the SMA 112 (step 310).

The SMA 112 includes a webserver component running on the management station 110. Typically, web-based user interfaces (browser web page) do not show new information until the browser's data is refreshed, either manually by the user or automatically by the browser. However, such a refresh causes the entire displayed screen to be refreshed and introduces a delay. In accordance with the present invention, the delay is avoided by automatically updating a predetermined section of the displayed web page 114 without refreshing the browser. When the web page 114 is loaded, a portion of the SMA code is included in the page data to specifically handle incoming event notifications. When the page load has been completed, the code identifies a specific HTML element 116 in the page 114 where new event notifications will be displayed. After the element 116 is identified, the code registers a time to execute at predetermined intervals. At such intervals, the code performs a request, such as an HTTP request, transparent to the user, to obtain any new event notifications from the webserver component. The new event notifications are generated by parsing the latest received data.

After the event data is received by the code, it is automatically inserted into the predetermined HTML element 116 of the web page 114 (step 312) and displayed (step 314). Consequently, any page that has already been loaded into the browser is updated with event data automatically, in real-time and without requiring a page refresh.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for providing real-time notification of an event which has occurred in a computer-related device.

What is claimed is:

1. A method for providing real-time notification of an event which has occurred in a computer-related device, comprising:
   registering a system management application (SMA) with a common information model (CIM) agent associated with the device whereby the CIM agent stores the identity of the SMA, the CIM agent including an HTTP server;
   storing in a buffer a record of a predetermined event occurring in a computer-related device;
   obtaining in the CIM agent the identity of the SMA;
   transmitting an event notification from the CIM agent to the SMA;
   transmitting a message from the SMA to the CIM agent requesting the record of the event from the updated buffer;
   receiving in the SMA the record of the event from the updated buffer;
   receiving one of a series of regular requests from an open browser window on a user computer for any record of the event stored in the buffer; and
   in response to the request, transmitting the record of the event to an HTML event element in a page of the browser window whereby the record of the event is inserted into the HTML element and displayed in the browser window.

2. The method of claim 1, wherein:
   receiving one of a series of regular requests from the browser window on the user computer comprises receiving the regular requests in the SMA; and
   transmitting the record of the event to the HTML element comprises:
      receiving in the SMA the record of the event from the updated buffer; and
      transmitting the record of the event from the SMA to the HTML element.

3. The method of claim 1, wherein:
   registering an SMA with the CIM comprises registering a plurality of SMAs with the CIM; and transmitting the event notification comprises transmitting the event notification to each of the plurality of SMAs.

4. The method of claim 1, wherein storing in the buffer comprising storing in a Really Simple Syndication buffer.

5. The method of claim 1, wherein receiving one of a series of regular requests comprises receiving one of a series of regular HTTP requests.

6. A method for providing real-time event notification, comprising:
   opening a browser window on a user computer;
   loading a page in the browser window, the page including a predetermined HTML event element;
   registering a system management application (SMA) with a common information model (CIM) agent associated with a computer-related device whereby the CIM agent stores the identity of the SMA, the CIM agent including an HTTP server; and
   upon the occurrence in the device of a predetermined event:
      updating a buffer, associated with the device, with a record of the event;
      obtaining in the CIM agent the identity of the SMA;
      transmitting an event notification from the CIM agent to the SMA;
      transmitting a message from the SMA to the CIM agent requesting the record of the event from the updated buffer;
      receiving in the SMA the record of the event from the updated buffer;
      transmitting an request at regular intervals from the user computer to the SMA for any record of the event from the updated the buffer;
      transmitting the record of the event from the SMA to the user computer; and
      inserting the record of the event into the predetermined HTML element, whereby the record of the event is displayed in the browser window.

7. The method of claim 6, wherein:
   registering an SMA with the CIM comprises registering a plurality of SMAs with the CIM; and
   transmitting the event notification comprises transmitting the event notification to each of the plurality of SMAs.

8. A system for providing real-time notification of events associated with a computer-related device, comprising:
   a buffer operable to store a record of a predetermined event occurring in a computer-related device; and
   a common information model (CIM) agent associated with the device operable, upon the occurrence of the event, to:
      receive a registration of an identity of a system management application (SMA);
      transmit an event notification to the SMA;
      receive a command from the SMA requesting the record of the event; and
      direct that the buffer transmit the record of the event to the SMA for subsequent transmission to a user computer and insertion into a predetermined HTML element in a web browser window of the computer for display in the browser window.

9. The system of claim 8, wherein the CIM is further operable to:
   register a plurality of SMAs;
   transmit the event notification to each of the plurality of registered SMAs; and
   direct that the buffer transmit the record of the event to each of the registered SMAs for subsequent transmission to a corresponding user computer and insertion into a predetermined HTML element in a web browser window of the corresponding computer for display in the browser window.

10. The system of claim 8, wherein the buffer is embedded in the device.

11. The system of claim 8, wherein the buffer is embedded in a management station.

12. The system of claim 8, wherein the buffer comprises a Really Simple Syndication buffer.

13. A computer program product of a computer readable non-transitory storage medium usable with a programmable computer, the computer program product having computer-readable code embodied therein for providing real-time notification of an event which has occurred in a computer-related device, the computer-readable code comprising instructions for:
   registering a system management application (SMA) with a common information model (CIM) agent associated with the device whereby the CIM agent stores the identity of the SMA, the CIM agent including an HTTP server;
   storing in a buffer a record of a predetermined event occurring in a computer-related device;
   obtaining in the CIM agent the identity of the SMA:
   transmitting an event notification from the CIM agent to the SMA;
   transmitting a message from the SMA to the CIM agent requesting the record of the event from the updated buffer;
   receiving in the SMA the record of the event from the updated buffer;
   receiving one of a series of regular requests from an open browser window on a user computer for any record of the event stored in the buffer;
   in response to the request, transmitting the record of the event to an HTML event element in a page of the browser window whereby the record of the event is inserted into the HTML element and displayed in the browser window.

14. The computer program product of claim 13, wherein:
   the instructions for receiving one of a series of regular requests from the browser window on the user computer comprise instructions for receiving the regular requests in the SMA; and
   the instructions for transmitting the record of the event to the HTML element comprise instructions for:
      receiving in the SMA the record of the event from the updated buffer; and
      transmitting the record of the event from the SMA to the HTML element.

15. The computer program product of claim 13, wherein:
   the instructions for registering an SMA with the CIM comprise instructions for registering a plurality of SMAs with the CIM; and
   the instructions for transmitting the event notification comprise instructions for transmitting the event notification to each of the plurality of SMAs.

* * * * *